United States Patent
Baer et al.

(10) Patent No.: US 7,363,698 B2
(45) Date of Patent: Apr. 29, 2008

(54) PROCESS FOR CREATING A WRITE HEAD BY FORMING A BUMP AFTER THE TOP POLE IS FORMED

(75) Inventors: Amanda Baer, Campbell, CA (US); Hamid Balamane, Palo Alto, CA (US); Daniel Wayne Bedell, Gilroy, CA (US); Jyh-Shuey Jerry Lo, San Jose, CA (US); Vladimir Nikitin, Campbell, CA (US); Aron Pentek, San Jose, CA (US); Yvette Winton, San Francisco, CA (US)

(73) Assignee: Hitachi Gobal Storage Technologies Inc. (NL)

( * ) Notice: Subject to any disclaimer, the term of this patent is extended or adjusted under 35 U.S.C. 154(b) by 341 days.

(21) Appl. No.: 10/956,221

(22) Filed: Sep. 30, 2004

(65) Prior Publication Data

US 2006/0070231 A1    Apr. 6, 2006

(51) Int. Cl.
*G11B 5/127* (2006.01)
*H04R 31/00* (2006.01)

(52) U.S. Cl. .............................. 29/603.16; 29/603.13; 29/603.15; 29/603.18; 216/22; 216/26; 360/122; 360/126; 360/317; 451/5; 451/41

(58) Field of Classification Search ..............
29/603.13–603.16, 603.18; 216/22, 26; 360/122, 126, 317; 451/5, 41
See application file for complete search history.

(56) References Cited

U.S. PATENT DOCUMENTS

| 5,438,747 | A  | * | 8/1995 | Krounbi et al. ........... 29/603.16 |
| 5,649,351 | A  | * | 7/1997 | Cole et al. ................ 29/603.14 |
| 5,751,526 | A  |   | 5/1998 | Schemmel .................. 360/113 |
| 6,419,845 | B1 | * | 7/2002 | Sasaki ......................... 216/22 |
| 6,513,228 | B1 |   | 2/2003 | Khizroev et al. ....... 29/603.014 |
| 6,741,422 | B2 |   | 5/2004 | Hsiao et al. ................. 360/126 |
| 2003/0179498 | A1 | | 9/2003 | Hsiao et al. .................. 29/360 |
| 2004/0001282 | A1 | | 1/2004 | Dinan et al. ................ 360/125 |

* cited by examiner

*Primary Examiner*—Paul D. Kim

(57) ABSTRACT

Methods for creating a write head by forming a bump after the top pole is formed are provided. In one embodiment, a bottom pole is created out of a first layer. A non-magnetic gap material is applied to the surface of the wafer. A top pole is created out of a second layer. After creating the top pole, a bump is created. The bump is used to protect at least a portion of the first layer while etching to create a stray flux absorber.

26 Claims, 16 Drawing Sheets

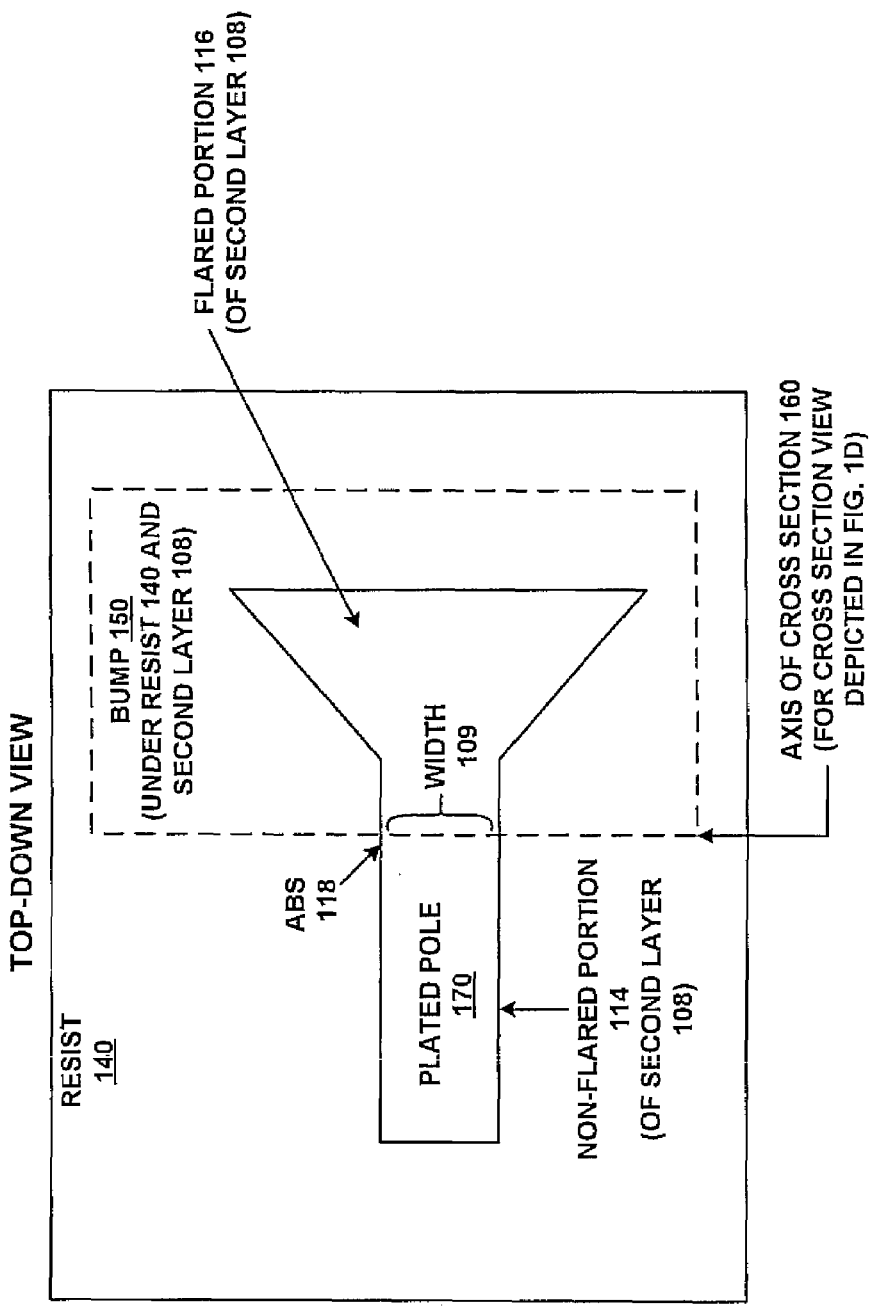

325

```
APPLYING A RESIST ON TOP OF THE SECOND LAYER
330
```

```
IMAGING THE WAFER TO REMOVE THE RESIST FROM
AN AREA THAT COVERS A PORTION OF THE TOP POLE
335
```

```
CREATING THE BUMP BY APPLYING BUMP MATERIAL
INTO THE AREA WHERE THE RESIST WAS REMOVED
340
```

FIGURE 3B

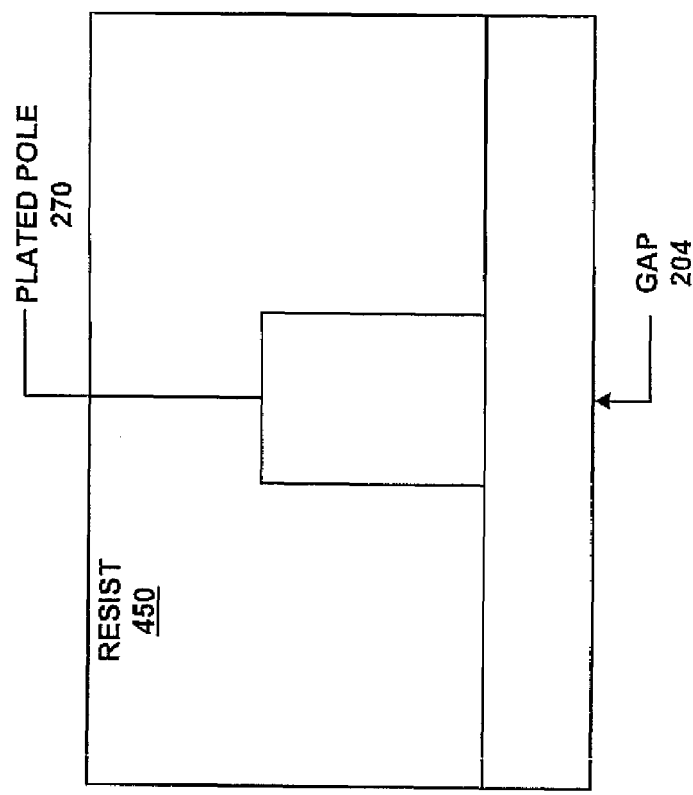

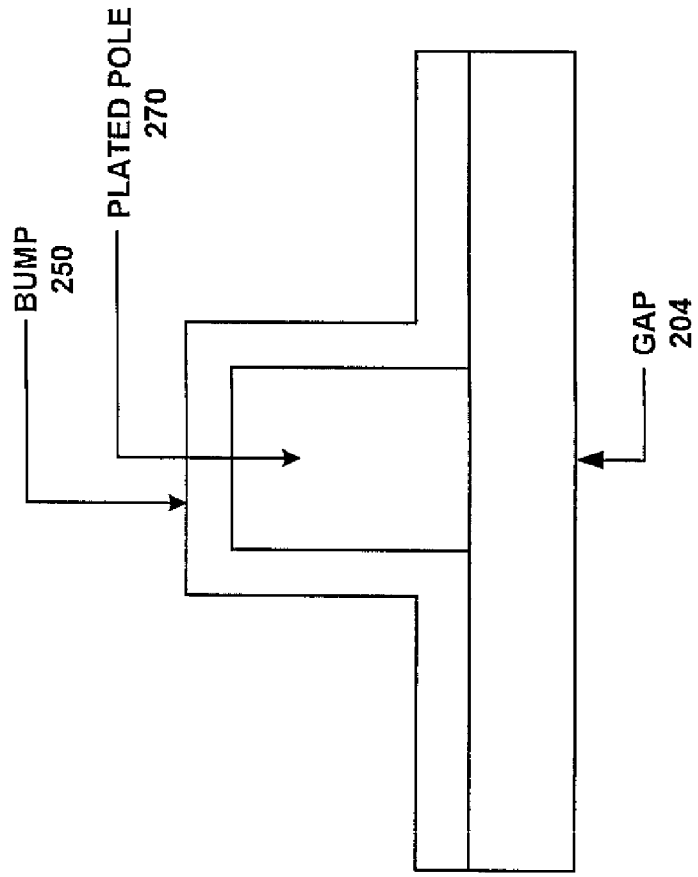

325

```
┌─────────────────────────────────────────┐
│ APPLYING MATERIAL FOR CREATING THE BUMP TO │
│              THE WAFER                  │
│                 530                     │
└─────────────────────────────────────────┘
                    │
┌─────────────────────────────────────────┐
│ CREATING THE BUMP BY SELECTIVELY REMOVING A │
│ PORTION OF THE MATERIAL FROM AN AREA WHERE │
│         THE BUMP IS NOT WANTED          │
│                 535                     │
└─────────────────────────────────────────┘
```

FIGURE 5

PROCESS FOR CREATING A WRITE HEAD BY FORMING A BUMP AFTER THE TOP POLE IS FORMED

TECHNICAL FIELD

Embodiments of the present invention relate to the field of electronic data storage and retrieval. More specifically, embodiments of the present invention relate to techniques for manufacturing disk write heads by creating a structure that can be used while creating a stray flux absorber. According to one embodiment, the structure is created after the creation of a top pole associated with a disk write head.

BACKGROUND ART

Disk write heads are used to write data to magnetic recording disks using a magnetic field. FIG. 1A is a block diagram of the magnetic poles associated with a disk write head. For example, as depicted in FIG. 1A the disk write head 100 includes a bottom pole 113 and a top pole 112 which are separated by a gap 104. The gap 104 can be created with dialectic non-magnetic material. The top pole 112 and the bottom pole 113 together are commonly referred to in the art as the "pole tip." The gap 104 is also commonly known as a "write gap."

Further as depicted in FIG. 1A, the disk write head 100 includes first layer (P1) 102, second layer (P2) 108, and third layer (P3) 110 that has been put through a thin film manufacturing process to create the disk write head 100. For example, a material known as first layer 102 can be applied (also known as "deposited") to the wafer. The second layer 108 can be applied on the wafer followed by a third layer 110. The wafer can also be subjected to various processes such as transferring, etching, and imaging, as will become more evident, to create the bottom pole 113 out of the first layer 102 and the top pole 112 out of the second layer 108, among other things.

Further, the top pole 112 is created to have a flared portion of second layer 116 and a non-flared portion of second layer 114. The ABS 118 is the interface that is used for writing data to an "intended track" of a magnetic recording disk using a magnetic field. The pole tip can turned 90 degrees so that the ABS 118 flies over a magnetic recording disk while writing data to an "intended track." The stray flux absorber 120 is used to reduce the magnetic field from being written to tracks that are adjacent to the "intended track."

FIG. 1B is a block diagram that depicts a disk write head from the front view. FIG. 1B depicts the front view of the non-flared portion 114 of the top pole 112, which is created from second layer 108, the gap 104 that separates the second layer 108 from the first layer 102, the bottom pole 113, which has been created from the first layer 102, and the stray flux absorber 120. The stray flux absorber 120, as depicted in FIG. 1B, has been created by notching (e.g., notches 130A, 130B) that go down from the second layer 108 into the first layer 102.

Width 109 is the width of the non-flared portion 114 of the top pole 112 (FIG. 1) at the ABS 118. The width 109 needs to be wide enough so that a strong enough magnetic field can be created at the ABS 118 to write data to an "intended track" but not so wide that the magnetic field writes on tracks that are adjacent to the "intended track."

The bottom of the non-flared portion 114 is used to determine how to notch down into the gap 104 and the first layer 102 to create notches 130A, 130B. Thus, the sides of the non-flared portion 114 line up approximately with the sides of the first layer 102 designated by notches 130A, 130B. Etching can be used to create notches 130A, 130B, which results in creating the stray flux absorber 120. The stray flux absorber 120 is used to reduce the magnetic field from being written to tracks that are adjacent to the "intended track."

The most straight forward way to image the second layer 108 is to create notches 130A, 130B, however, unwanted material in the second layer 108 would be left causing disk write heads to be defective. One solution to this problem involves creating a structure that protects the top pole 112 while notching down to create the stray flux absorber 120. The structure that is used for creating the stray flux absorber 120 shall be referred to hereinafter as a "bump."

FIG. 1C is a block diagram that depicts a top down view of a disk write head during a phase of manufacturing the disk write head. During this phase of manufacturing, a bump 150 is created under resist 140 and second layer 108. As depicted in FIG. 1C, the bump layer 150 is under the flared portion of the second layer 116 and under a part of the non-flared portion of the second layer 114. Further, the bump 150 is created before the top pole 170 is created and, therefore, is under the plated top pole 170.

FIG. 1C further depicts an axis of cross section 160 for a cross section view depicted in FIG. 1D. FIG. 1D is a block diagram of the cross section view of FIG. 1C. In FIG. 1D, the bump 150 is depicted between the first layer 102 and the top pole 170. The gap 104 separates not only the bump 150 from the first layer 102 but also the resist 140.

The planarized surface of the first layer 119 is created with chemical and mechanical polish, for example. It is critical that the planarized surface 119 be as smooth as possible. The problem with bump 150 is that it adds topography on top of the planarized surface of first layer 119 resulting in greater variability in the width 109 of the top pole 112 at the ABS 118. For example, when manufacturing disk write heads, there is a desired range of widths 109. If the width 109 of the top pole 112 at the ABS 118 for a particular disk write head falls within that range, the disk write head meets quality standards. Otherwise, the disk write head cannot be used. The bump 150 as depicted in FIGS. 1C and 1D lowers the number of disk write heads that meet the quality standards for the width 109 because bump 150 adds topography on top of the planarized surface of first layer 119.

SUMMARY OF THE INVENTION

Therefore, there is a need for creating a bump that protects at least a portion of the top pole while notching down to create the stray flux absorber while not adding topography to the top of the planarized surface of the first layer 119, which lowers the number of disk write heads that meet quality standards.

Embodiments of the present invention pertain to a method of creating a disk write head. In general, as described, the bump structure is applied after the top pole is made, e.g., after plating up the pole tip. A bottom pole is created out of a first layer. A non-magnetic gap material is applied to the surface of the wafer. A top pole is created out of a second layer. After creating the top pole, a bump is created. The bump is used to protect at least a portion of the first layer while etching to create a stray flux absorber.

There are many methods that can be used to create a bump structure. Examples of these methods include, but are not limited to: (1) creating a hole and applying bump material into the hole to create the bump (the additive process), and (2) applying various materials to the wafer and selectively removing portions of the materials from an area where the bump is not wanted (the subtractive process).

BRIEF DESCRIPTION OF THE DRAWINGS

The accompanying drawings, which are incorporated in and form a part of this specification, illustrate embodiments of the invention and, together with the description, serve to explain the principles of the invention:

FIG. 1C is a prior art block diagram that depicts a top down view of a disk write head during a phase of manufacturing the disk write head.

FIGS. 3A, 3B depict flowcharts for creating a bump, according to embodiments of the present invention.

FIG. 4B depicts a block diagram of a cross section view of FIG. 4A after resist has been applied on top of the second layer, according to embodiments of the present invention.

FIG. 4C depicts a block diagram of a cross section view of area 404 (FIG. 4A) after material has been applied to the wafer to create the bump on top of the top pole, according to embodiments of the present invention.

FIG. 5 depicts a flowchart for creating a bump using the deposition method, according to methods of the present invention.

The drawings referred to in this description should not be understood as being drawn to scale except if specifically noted.

BEST MODE FOR CARRYING OUT THE INVENTION

Reference will now be made in detail to various embodiments of the invention, examples of which are illustrated in the accompanying drawings. While the invention will be described in conjunction with these embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following description of the present invention, numerous specific details are set forth in order to provide a thorough understanding of the present invention. In other instances, well-known methods, procedures, components, and circuits have not been described in detail as not to unnecessarily obscure aspects of the present invention.

OVERVIEW

The stray flux absorber is used to reduce the magnetic field from writing on tracks that are adjacent to the intended track that is being written to. Bump material is used to protect at least a portion of the top pole while notching down to create the stray flux absorber. By creating the bump after the top pole is formed, according to one embodiment, the additional topography on top of the planarized surface is avoided; thus, the width can be better controlled resulting in a larger number of disk write heads that meet quality standards, as will become more evident.

Figure 2A:
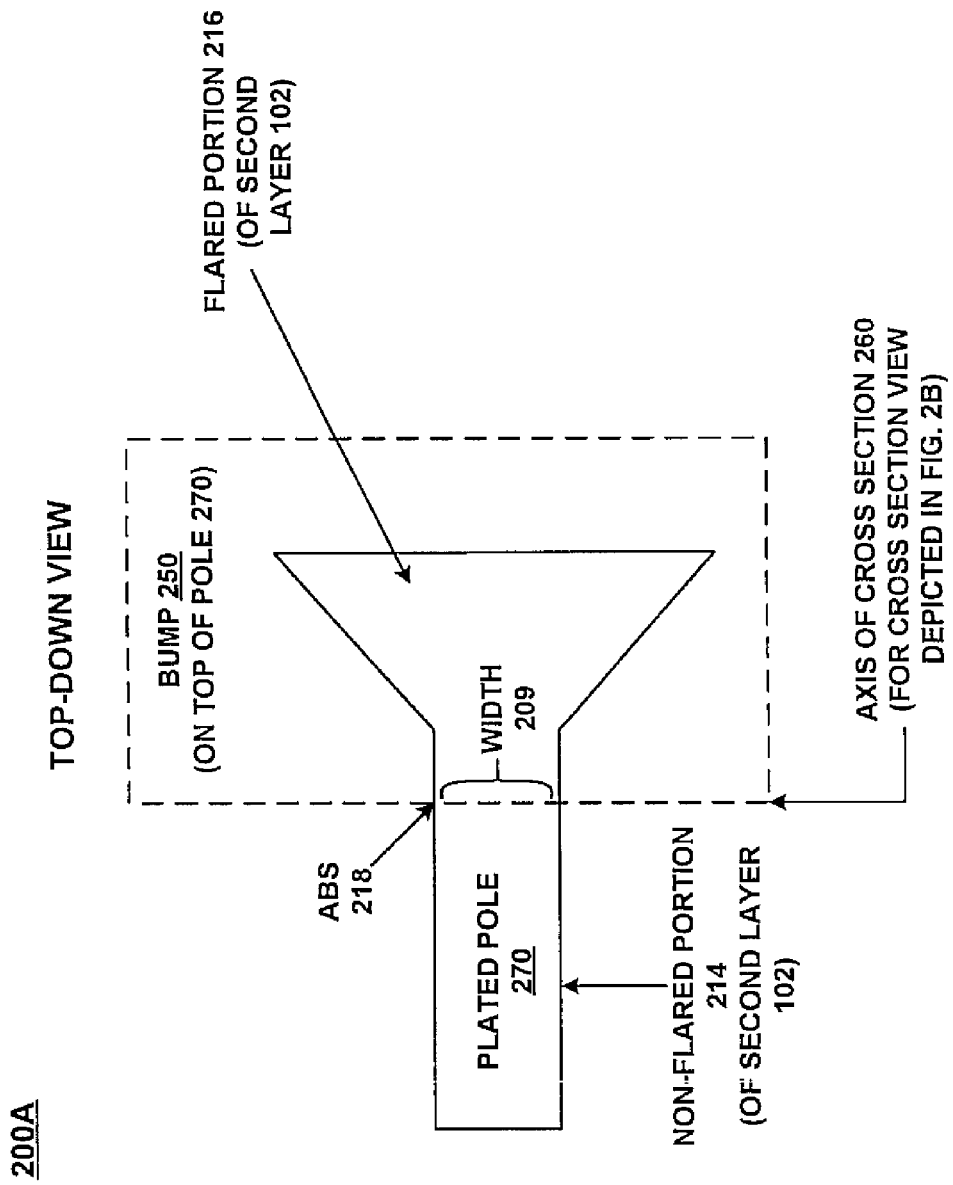
FIG. 2A is a block diagram of a top down view of a top pole created using a method where a bump is created after the top pole is created, according to embodiments of the present invention.

FIG. 2A is a block diagram of a top down view of a top pole created using a method where a bump structure is created after the formation of the top pole, according to embodiments of the present invention. The blocks in FIG. 2A can be arranged differently than as illustrated, and can implement additional or fewer features than what are described herein.

The top down view 200A includes a plated top pole 270, according to one embodiment. Conventional techniques can be used to form the pole e.g., photo lithography followed by a plating process. The plated top pole 270, according to one embodiment, is made of second layer material (P2) with an associated flared portion 216 and a non-flared portion 214. The bump 250 can be formed on top of the top pole 270, according to an embodiment of the present invention depicted in FIG. 2A.

Among other things, the bump 250 can be created out of metal oxides, aluminum oxides, alumina, or silicon dioxide, according to one embodiment. Although metal oxides, aluminum oxides, etc. have been given as examples of materials that the bump 250 can be created from, any material that is suitable for creating the bump 250 can be used. Width 209 is the width of the non-flared portion 214 of the second layer at the ABS 218.

Figure 2B:
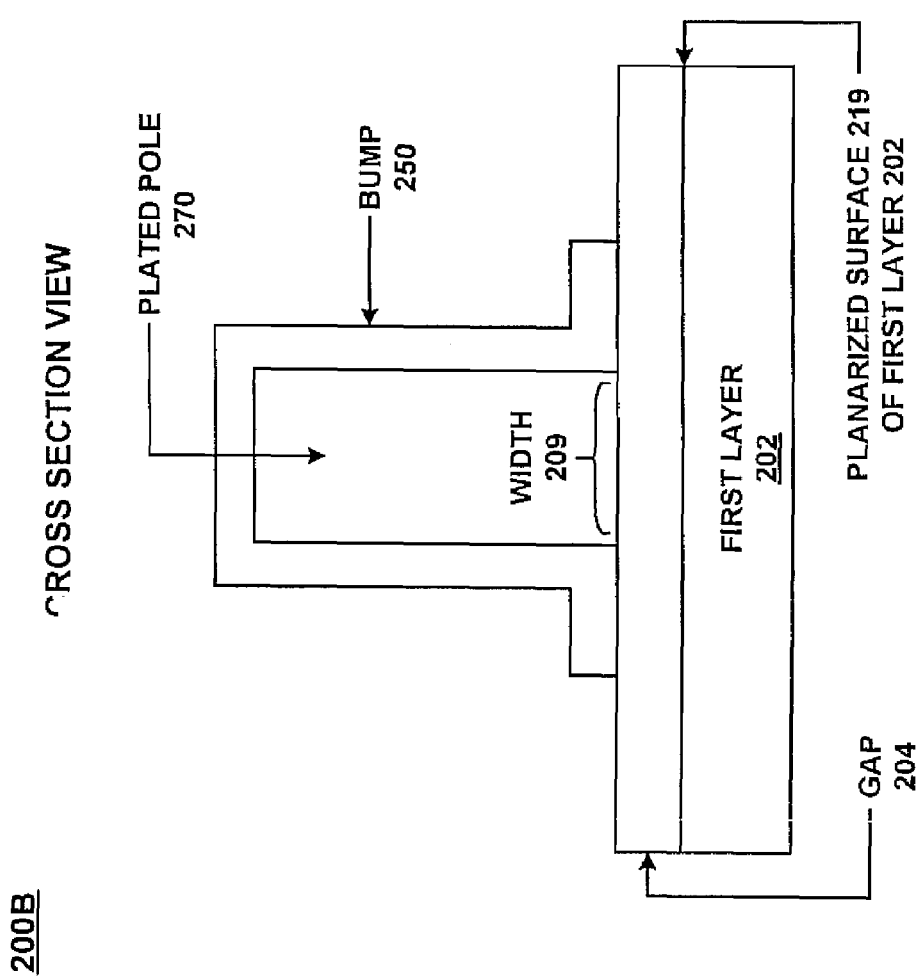
FIG. 2B is a block diagram of a cross section view of FIG. 2A, according to embodiments of the present invention.

FIG. 2A further depicts an axis of cross section 260 for a cross section view depicted in FIG. 2B. FIG. 2B is a block diagram of a cross section view of FIG. 2A. In FIG. 2B, the bump 250 is depicted on top of the plated top pole 270. As depicted in FIG. 2A, the bump 250 is on top of the flared portion of the second layer 216 and on top of a part of the non-flared portion of the second layer 214. Although, the bump layer 250 is depicted in FIG. 2A on top of the flared portion of the second layer 216 and on top of a part of the non-flared portion of the second layer 214, the bump 250 could be on top of any portion of the second layer that forms the top pole 270, according to embodiments of the present invention.

The top pole 270 can be made using convention processes, as described above, and can be plated with nickel phosphate, according to one embodiment. Although nickel phosphate has been given as an example of a material for plating at least a part of the top pole 270, any material that is suitable for plating the top pole 270 can be used. The gap 204 separates the bump 250 and the plated top pole 270 from the first layer 202. The first layer 202 has an associated planarized surface 219.

By creating the bump 250 on top of the top pole 270, according to one embodiment, the additional topography on top of the planarized surface 219 is avoided; thus, the width 209 can be better controlled resulting in a larger number of disk write heads that meet quality standards.

There are many methods that can be used to create a bump 250 after a top pole 270 is created, as will be described hereinafter. In one embodiment, a hole is created and bump material is applied into the hole to create the bump (the additive process). In an alternative embodiment, after applying materials to the wafer at the selected locations to form a bump, unwanted material may be selectively removed from areas where the bump is not wanted (the subtractive process).

As described further below, the bump can be used in subsequent etch steps to protect at least a portion of the top pole 270 while notching into the first layer 202 to form the stray flux absorber. According to one embodiment, at least a portion of the bump 250 can be removed after the stray flux absorber has been created.

Figure 1A:
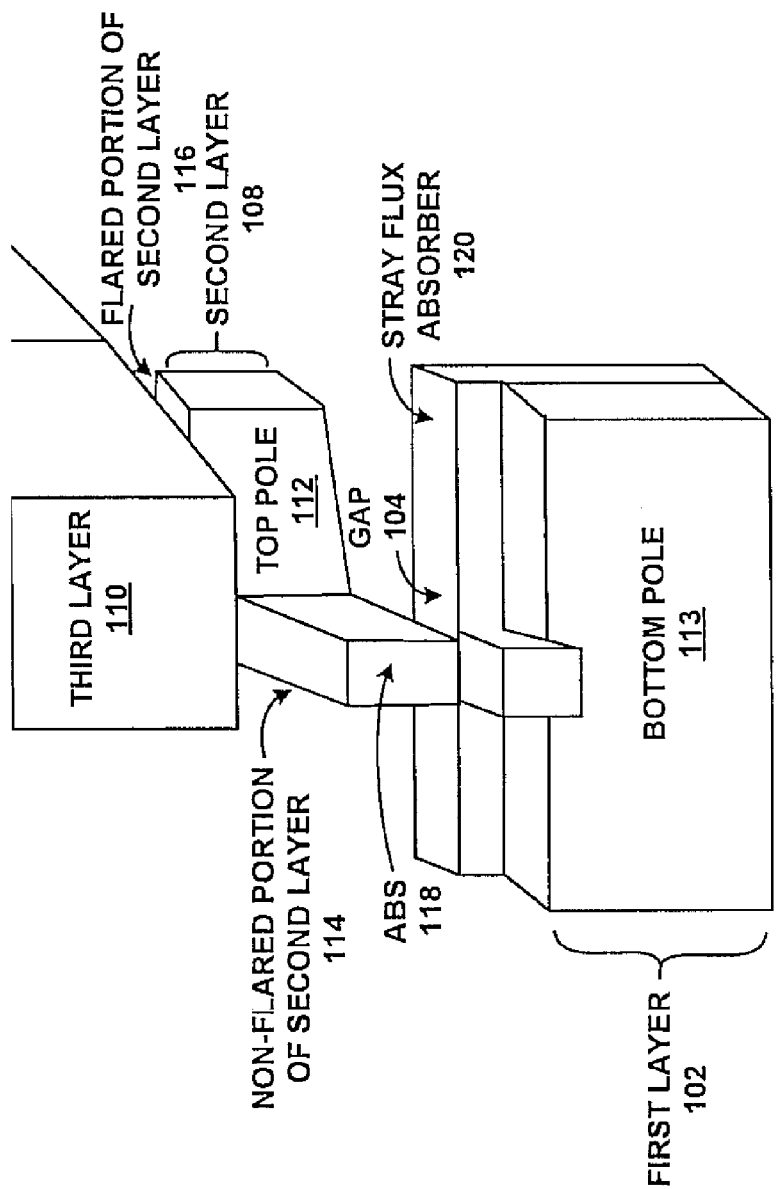
FIG. 1A is a prior art block diagram of a disk write head.
Figure 1B:
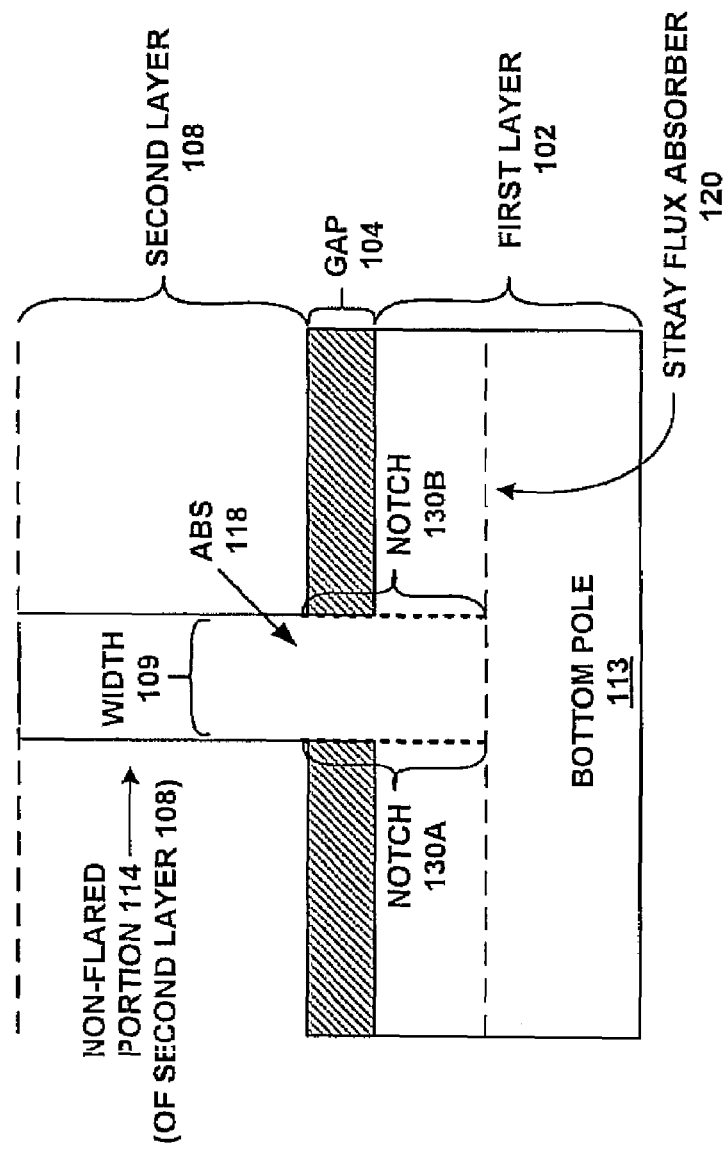
FIG. 1B is a prior art block diagram that depicts a disk write head from the front view during a particular phase of manufacturing the disk write head.
Figure 1D:
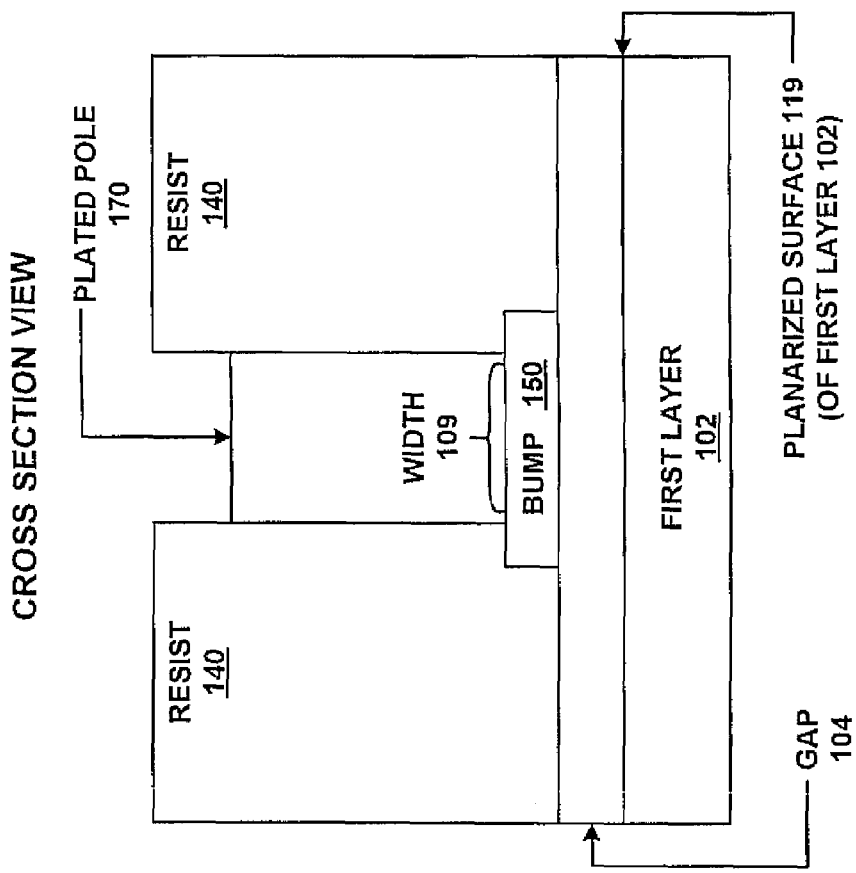
FIG. 1D is a prior art block diagram of a cross section view of FIG. 1C.

Ion milling and reactive ion etching (RIE) are two exemplary processes used to define and form the write head yoke, including the bottom pole (P1) 113, the top pole (P2) 114 and the non-flared portion of the top pole (P3) 114 (see FIG. 1). Using ion milling and/or RIE the desired topography is transferred or created through imaging, in addition to using other processes such depositing photo resist, plating, etc. . . As will be described in more detail, imaging uses a method of exposing photo resist to light and then developing to remove unwanted materials. Although certain embodiments are described using etching, transferring can be used as well. Similarly, although certain embodiments are described using one type of process for creating a topography, other types of processes can be used for creating the same topography.

OPERATIONAL EXAMPLES

Figure 3A:
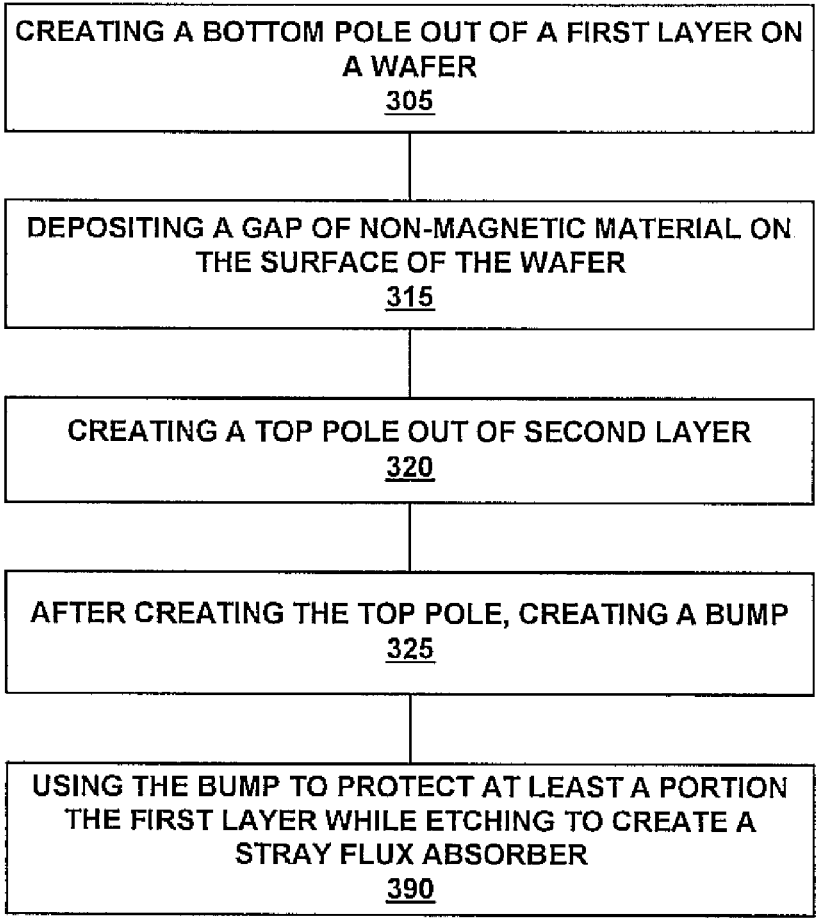

FIGS. 3A, 3B depict a flowchart 300 for creating a bump, according to embodiments of the present invention. Although specific steps are disclosed in flowchart 300, such steps are exemplary. That is, embodiments of the present invention are well suited to performing various other steps or variations of the steps recited in flowchart 300. It is appreciated that the steps in flowchart 300 may be performed in an order different than presented, and that not all of the steps in flowchart 300 may be performed. For the purposes of illustration, the discussion of flowchart 300 shall refer to the structures depicted in FIGS. 2A, 2B, 4A, 4B, and 4C.

In step 305, a bottom pole (P1) is created out of a first layer, according to one embodiment. The surface of the wafer can be planarized, as already described herein, according to another embodiment. For example, the first layer 202 (FIG. 2B) can be planarized resulting in the planarized surface 219 (FIG. 2B)

In step 315, a gap of non-magnetic material is deposited on the surface of the wafer, according to yet another embodiment. For example, non-magnetic material can be applied to the wafer to create a gap 204 (FIG. 2B).

In step 320, a top pole (P2) is created out of a second layer, according to still another embodiment. For example, the second layer can be plated to create the top pole 270 (FIG. 2A).

In step 325, after creating the top pole, a bump is created, according to another embodiment. For example, after the top pole 270 (FIG. 2A, 2B, 4A, 4B, 4C, 4D, 6A, 6B, 6C, 6D, 6E) is created, the bump 250 (see FIGS. 2A, 2B, 4C, 4D, 6B, 6C, 6E) can be created. The bump 250 can be on top of at least a portion of the top pole, according to one embodiment, and/or can be on the side of at least a portion of the top pole, according to another embodiment. For this illustration, assume that the bump 250 is on top of at least a portion of the top pole 270.

Various methods can be used to create the bump 250 after the top pole 270 is created. Examples of these methods include, among other things: (1) creating a hole and apply bump material into the hole to create the bump 250 and (2) applying various materials to the wafer and selectively removing portions of the materials from an area where the bump 250 is not wanted. The plate through photo method (also commonly known as the "plate through mask method") and the image transfer method are examples of the first method and the deposition and etch method is an example of the second method. A method commonly known as "deposit and lift" can be used in conjunction with the first method to apply bump material into the hole. In the "deposit and lift" method bump material is applied to the wafer after the hole is created. The bump material is selectively removed from the areas where bump material is not wanted, thus, bump material remains in the hole.

In step 390, the bump is used to protect at least a portion of the first layer while etching or milling to create a stray flux absorber, according to yet another embodiment. For example, referring FIG. 4D, notches 280A, 280B can be created by notching into a part of the first layer 202 resulting in a stray flux absorber 420. According to one embodiment, the bump 250 provides protection for at least a portion of the first layer 202 while creating the stray flux absorber 420 while notching. According to another embodiment, the bump 250 provides a pattern for creating the notches 280A, 280B. The bump 250 can be removed after the stray flux absorber 420 is created.

FIG. 3B depicts a flowchart for step 325 for creating a bump using the plate through photo method, according to embodiments of the present invention.

In step 330 of FIG. 3B, a resist is applied on top of the second layer, according to one embodiment. The resist 450 covers the wafer, thus, the flared portion of the second layer 216 as well as the non-flared portion of the second layer 214 are covered with resist 250, according to one embodiment.

Figure 4A:
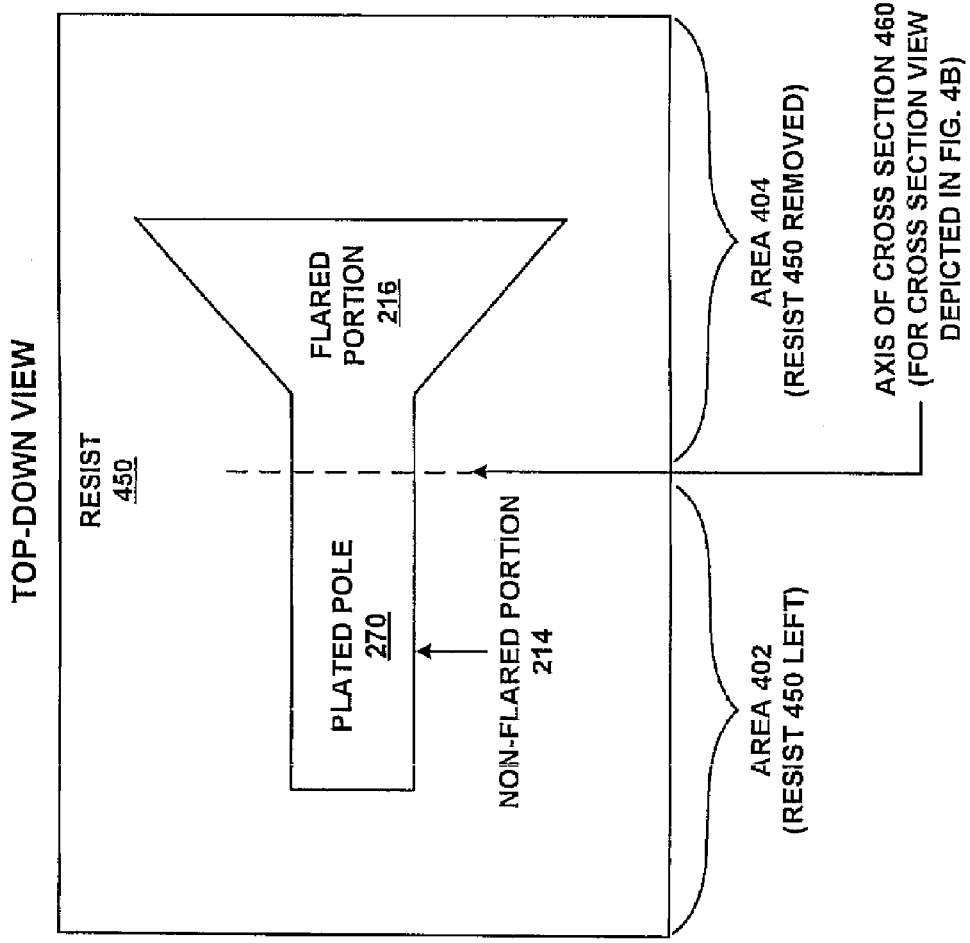
FIG. 4A is a block diagram of a disk write head during a particular phase of creating a bump using the plate through photo method, according to embodiments of the present invention.
Figure 4D:
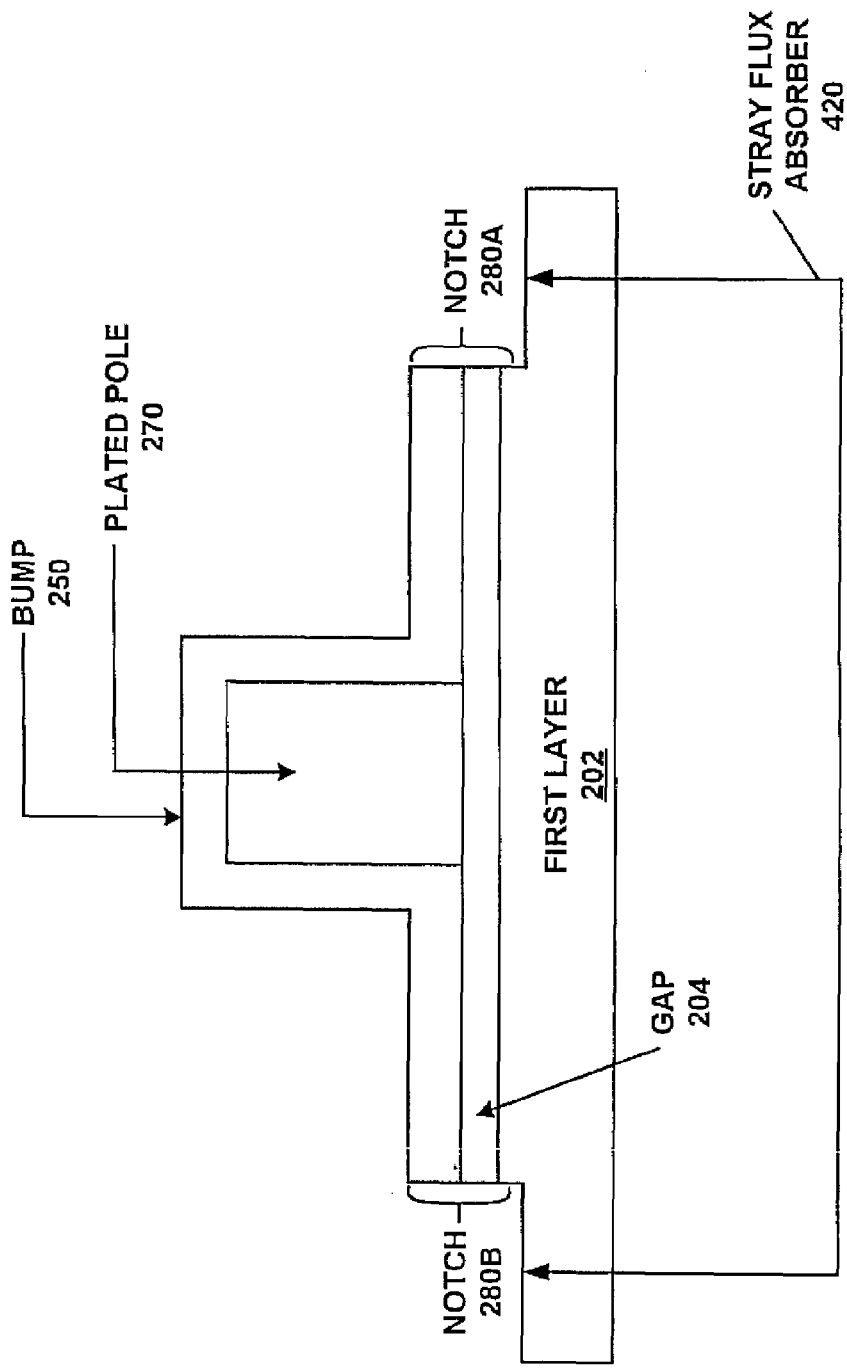
FIG. 4D depicts a block diagram of a portion of a disk write head after notching has been performed to create a stray flux absorber, according to embodiments of the invention.

FIG. 4A further depicts an axis of cross section 460 for a cross section view depicted in FIG. 4B. FIG. 4B depicts a block diagram of a cross section view 460 of FIG. 4A after resist 450 has been applied on top of the second layer.

In step 335, the wafer is imaged to remove the resist from an area that covers a portion of the top pole, according to another embodiment. For example, the wafer is imaged so that a portion of resist 450 can be removed from the area 404 (FIG. 4A) that covers the flared portion 216 and a part of the non-flared portion 214 of the plated top pole 270, according to one embodiment.

According to one embodiment, a portion of resist 450 is removed by exposure and development. Typically, imaging involves exposing a portion of resist 450 to light and then using what is commonly known as a "developer" to remove the unwanted portion of resist 450 (e.g., area 404).

In step 340, the bump is created by applying bump material into the area where the resist was removed, according to yet another embodiment. For example, according to one embodiment, removing the resist 450 from the area 404 results in a "hole" where the bump material can be applied into to create the bump. For example, material for the bump 250 can be applied into the "hole" (e.g., area 404) to create the bump 250 on top of the plated top pole 270. FIG. 4C depicts a block diagram of a cross section view of area 404 after material has been applied into the "hole" (e.g., area 404) and after resist 450 has been removed, according to one embodiment.

FIG. 5 depicts flowchart for step 325 using the deposition method, according to embodiments of the present invention. Although specific steps are disclosed in flowchart 500, such steps are exemplary. That is, embodiments of the present invention are well suited to performing various other steps or variations of the steps recited in flowchart 500. It is appreciated that the steps in flowchart 500 may be performed in an order different than presented, and that not all of the steps in flowchart 500 may be performed. For the purposes of illustration, the discussion of the flowchart depicted in FIG. 5 shall refer to the structures depicted in FIGS. 2A, 2B, and 6A to 6E.

Figure 6A:
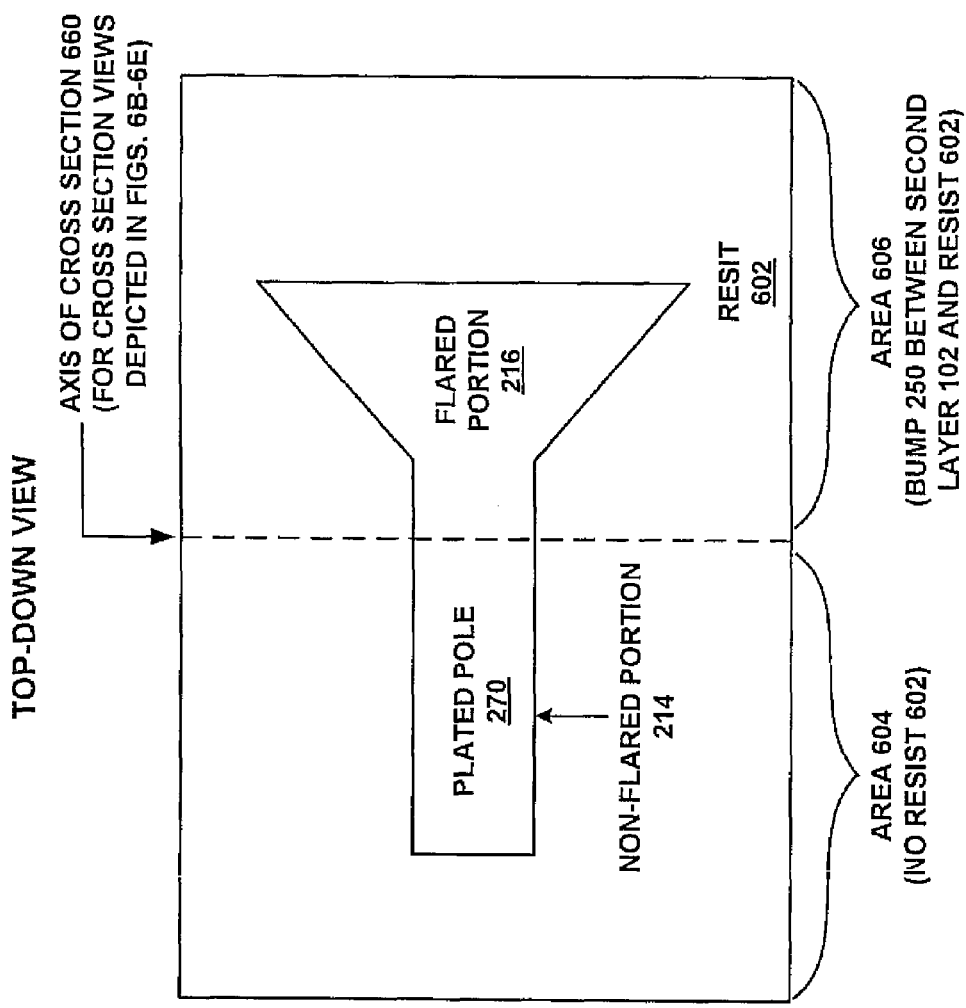
FIG. 6A is a block diagram of a disk write head during a particular phase of creating a bump on top of a top pole using the deposition method, according to embodiments of the present invention.

In step 530, material for creating the bump is applied to the wafer, according to one embodiment. For example, material for creating the bump 250 is applied to the wafer so that the bump material covers areas 604 and 606 (FIG. 6A). The material for creating the bump 250 includes materials, such as metal oxides, aluminum oxides, among other things.

In step 535, the bump is created by selectively removing a portion of the material from an area where the bump is not wanted. For example, the bump is not wanted in area 604. In one embodiment, material for the bump is selectively removed from area 604. One method of selectively removing a portion of the material involves apply resist to the area 606 in order to protect the bump material in area 606 when the removing process is performed, according to one embodiment. For example, resist 602 is only applied to the area 606 (FIG. 6A), thus, the bump 250 is between the second layer 102 and the resist 602 in area 606, according to one embodiment. Area 604 has no resist 602 on it.

Figure 6C:
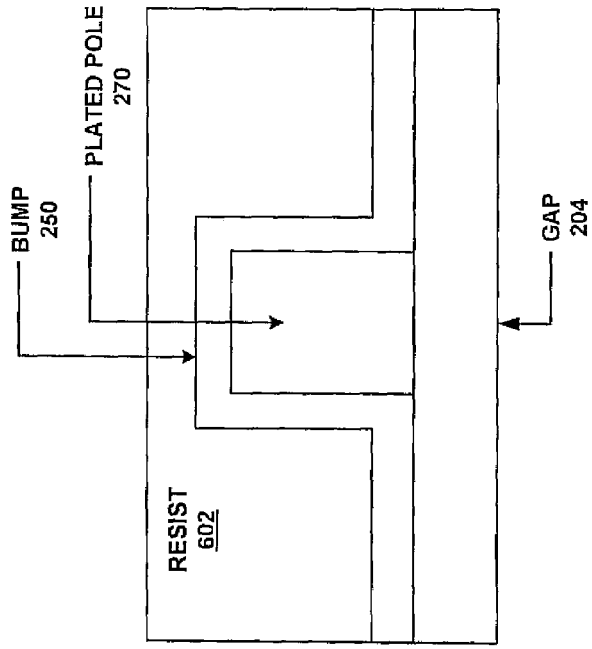
FIG. 6C is a block diagram of area 606 (FIG. 6A) after material for the bump has been applied to the wafer and the resist has been applied to area 606 (FIG. 6A), according to embodiments of the present invention.
Figure 6B:
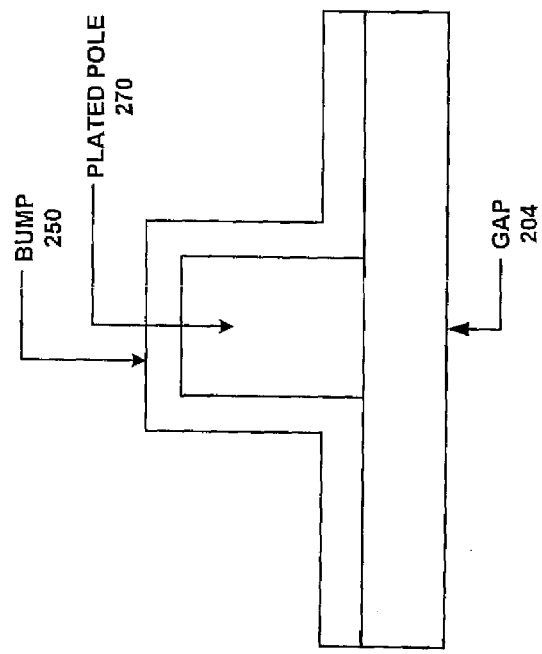
FIG. 6B is a block diagram of area 604 (FIG. 6A) after material for bump has been applied to the wafer, according to embodiments of the present invention.

FIG. 6B depicts a block diagram of area 604 after material for bump 250 has been applied to the wafer (FIG. 6A). FIG. 6C depicts a block diagram of area 606 after material for the bump 250 has been applied to the wafer and the resist 602 has been applied to area 606. Thus, area 604 (FIG. 6B) only has material for the bump 250, according to one embodiment, whereas, area 606 (FIG. 6C) has material for the bump 250 and for the resist 602, according to another embodiment.

Although FIG. 2A depicts the bump 250 on top of the flared portion 216 and a part of the non-flared portion 214, the bump 250 could be on top of any part of the second layer, according to embodiments of the present invention. Note, FIG. 6A depicts an axis of cross section 660 for views depicted in FIGS. 6B-6E.

Figure 6E:
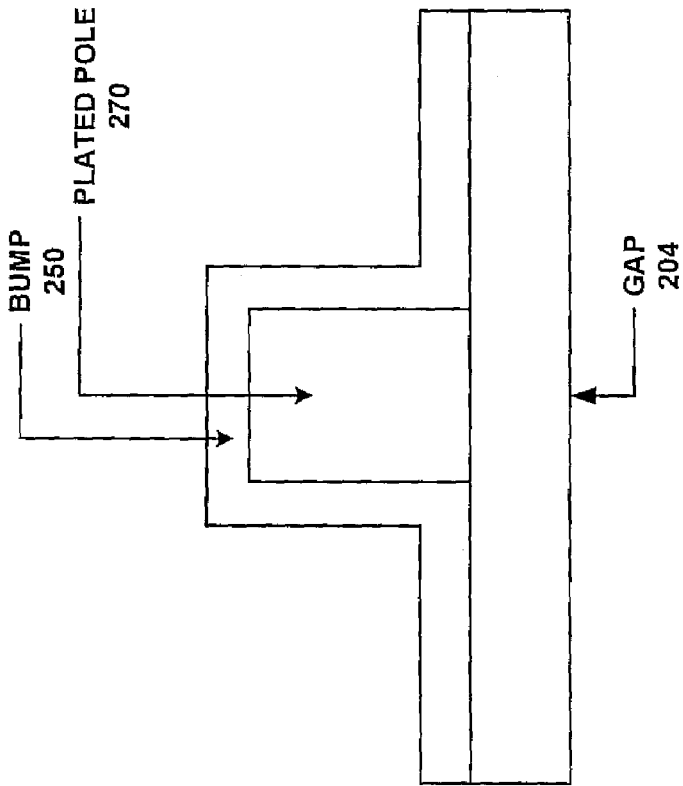
FIG. 6E is a block diagram of area 606 (FIG. 6A) after etching has been performed, according to one embodiment.
Figure 6D:
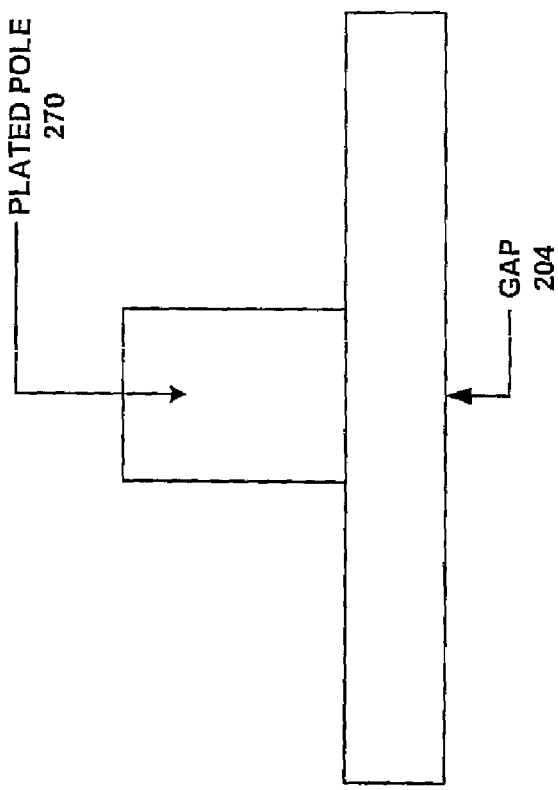
FIG. 6D is a block diagram of area 604 (FIG. 6A) after etching has been performed, according to one embodiment.

According to one embodiment, when the "selective removing process" is performed, the resist 602 is removed from area 606 and the material for the bump 250 is removed from area 604 (e.g., resulting in a selective removing of a portion of material from the area 604 where the bump is not wanted). For example, the bump 250 (FIG. 6B) is on the top of the wafer in area 604 (FIG. 6A) and the resist 602 (FIG. 6C) is on the top of the wafer for area 606 (FIG. 6A). By etching the wafer, according to one embodiment, the bump 250 (refer to FIGS. 6A and 6B) can be removed from area 604 (FIG. 6A) and the resist 602 (FIG. 6A and FIG. 6C) can be removed from area 606 (FIG. 6A). FIG. 6D is a block diagram of area 604 after material for the bump 250 has been removed and FIG. 6E is a block diagram of area 606 after resist is removed.

According to another embodiment, the bump is created in step 325 using the image transfer method. For example, the wafer can be covered with some etchable material, such as photo resist (e.g., first layer of photo resist). Then a second layer of etchable material can be applied to the wafer. The second layer of etchable material is selectively etchable with respect to the first layer, according to one embodiment. A photo resist can be applied to the wafer, according to another embodiment. An image is created by imaging the photo resist, according to yet another embodiment. A hole can be created for applying bump material into, for example, by transferring the image into the second layer and the first layer. The image is transferred into the two layers in two separate steps, according to one embodiment. The bump can be created by applying bump material into the hole, according to another embodiment. According to one embodiment, the bump can be created by what is commonly referred to in the art as "plating the bump."

CONCLUSION

The stray flux absorber is used to reduce the magnetic field from writing onto tracks that are adjacent to the intended track that is being written to. Bump material is used to create the stray flux absorber. By creating the bump 250 after the top pole 270 is created, according to one embodiment, the additional topography on top of the planarized surface 219 is avoided; thus, the width 209 can be better controlled resulting in a larger number of disk write heads that meet quality standards.

What is claimed is:

1. A method of creating a stray flux absorber, the method comprising:
    creating a bottom pole of first layer on a wafer;
    planarizing a surface of the wafer;
    depositing a gap of non-magnetic material on the surface of the wafer;
    creating a top pole of a second layer wherein creating the top pole comprises: depositing resist material onto the first layer; opening a hole in the resist material; plating up the top pole inside the hole; and removing the resist material;
    creating a bump on top of at least a part of the top pole; and
    using the bump to etch or mill the first layer to create the stray flux absorber.

2. The method as recited in claim 1, wherein the creating a bump comprises a plating process.

3. The method as recited in claim 2, wherein the bump is plated with nickel phosphate.

4. The method as recited in claim 1, wherein the bump is created with material selected from a group consisting of metal oxides, aluminum oxides, alumina, and silicon dioxide.

5. The method as recited in claim 1, wherein creating the bump further comprises applying material that covers a portion of the top pole to create the bump.

6. The method as recited in claim 1, wherein the creating the bump further comprises creating a hole and applying bump material into the hole to create the bump.

7. The method as recited in claim 1, wherein the creating the bump further comprises creating the bump using an image transfer method, wherein the image transfer method comprises:
applying a first layer of etchable material; applying a second layer of etchable material, wherein the second layer of etchable material is selectively etchable with respect to the first layer of etchable material;
applying photo resist to the wafer; creating an image by imaging the photo resist; creating the hole to apply bump material into by: transfering the image into the second layer of etchable material; and
transferring the image into the first layer of etchable material; and using the hole to create the bump by applying material for the bump into the hole.

8. The method as recited in claim 1, wherein the creating the bump further comprises using a deposit and lift method to create the bump, wherein the deposit and lift method comprises: applying bump material to wafer; and selectively removing the bump material from the area where the bump is not wanted.

9. The method as recited in claim 1, wherein the creating the bump further comprises creating the bump using a plating method, wherein the plating method comprises: creating a hole to add bump material; and adding the bump material by plating to form the bump.

10. The method as recited in claim 1, wherein the using the bump further comprises using the bump while notching the first layer to create the stray flux absorber.

11. A method of fabricating a write head comprising:
depositing a gap material onto a planarized first layer;
forming a top pole of a second material over the gap material wherein forming the top pole comprises: depositing resist material onto the first layer; opening a hole in the resist material; plating up the top pole inside the hole; and removing the resist material;
placing a layer of bump material on top of the top pole and a portion of exposed first layer; and
using the bump material to etch back into the first layer to create a stray flux absorbing structure for the write head.

12. The method as recited in claim 11, wherein the gap material is not magnetic.

13. A method as recited in claim 11, wherein the etching back involves deposition and photo resist processes to create the stray flux absorbing structure.

14. The method as recited in claim 13, wherein the etching back involves ion milling processes to create the stray flux absorbing structure.

15. A method of creating a write head, comprising:
forming a bottom pole; forming a write gap from non-magnetic material;
forming a top pole wherein forming the top pole comprises: depositing resist material onto the first layer; opening a hole in the resist material; plating up the top pole inside the hole; and removing the resist material;
after forming the top pole, forming a bump; and
notching the bottom pole.

16. The method of claim 15, wherein the notching further comprises using the bump to protect at least a portion of the bottom pole while notching the bottom pole.

17. The method of claim 15, wherein notching the bottom pole further comprises notching the bottom pole to create a stray flux absorber.

18. The method as recited in claim 15, wherein forming the bump further comprises forming the bump from photo resist.

19. The method as recited in claim 15, wherein the bump is formed by addition of a bump material in a hole created.

20. The method as recited in claim 15, wherein the addition of the bump material is by a plating process.

21. The method as recited in claim 20, wherein the bump is plated with nickel phosphate.

22. The method as recited in claim 15, wherein the bump is created with material selected from a group consisting of metal oxides, aluminum oxides, alumina, and silicon dioxide.

23. The method as recited in claim 15, wherein the bump is created by forming a layer of bump material over selected areas, and selectively removing bump material from desired locations.

24. The method as recited in claim 23, wherein the formation of a layer of bump material is by deposition.

25. The method as recited in claim 23 wherein the selective removal of bump material is by etching.

26. The method as recited in claim 23 wherein the selective removal of bump material is by ion milling.

* * * * *